April 24, 1956     S. NIELSEN     2,743,007
CONVEYING APPARATUS
Original Filed Jan. 28, 1949
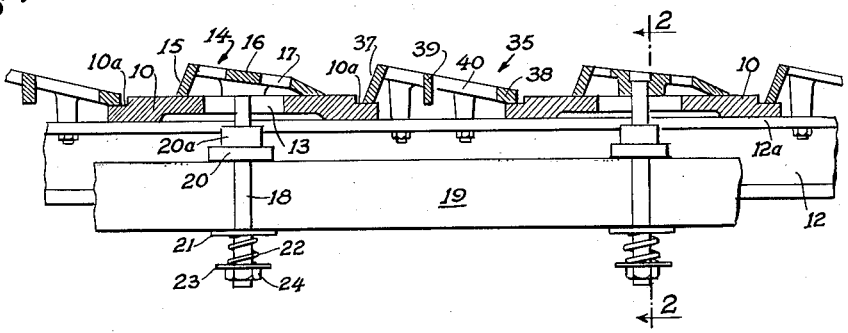
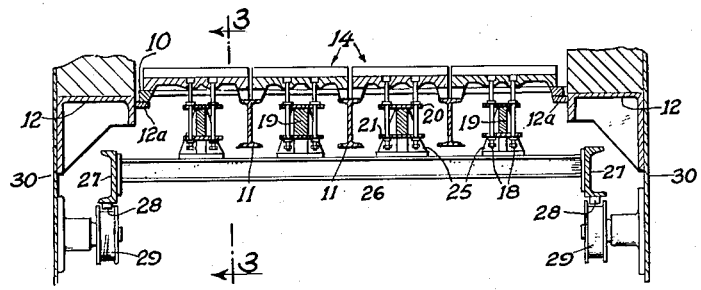
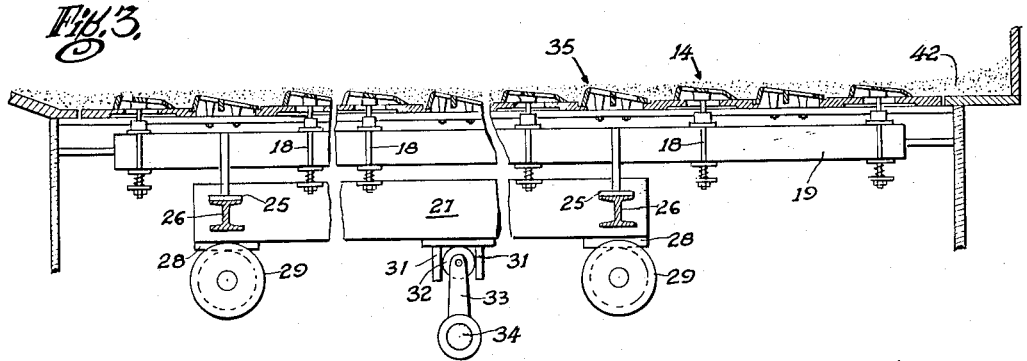
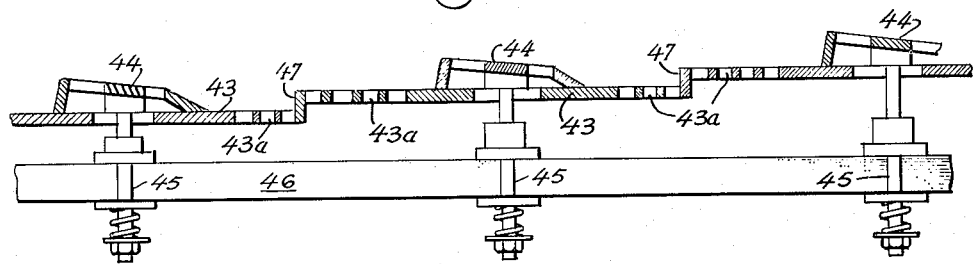
INVENTOR.
Sigurd Nielsen
BY
Pennie Edmonds Morton Barrows & Taylor
ATTORNEYS

United States Patent Office 2,743,007
Patented Apr. 24, 1956

2,743,007

CONVEYING APPARATUS

Sigurd Nielsen, Copenhagen, Denmark, assignor to F. L. Smidth & Co., New York, N. Y., a corporation of New Jersey Original application January 28, 1949, Serial No. 73,307. Divided and this application June 2, 1953, Serial No. 359,060

6 Claims. (Cl. 198—218)

This invention relates to conveyors for bulk materials and of the type, in which the materials being conveyed lie upon a stationary support and are advanced by reciprocating elements. More particularly, the invention is concerned with a novel conveyor, which is generally similar to that disclosed in my United States Patent No. 2,498,218, but differs therefrom in various features, the use of which results in greatly improved performance. The present application is a division of my copending application Serial No. 73,307, filed January 28, 1949, and now abandoned.

The conveyor of the above patent includes a generally horizontal support, which includes a plurality of bearing members spaced lengthwise along it and extending transversely. Each bearing member has a bearing surface at its top and an opening through the bearing surface. A conveying element rests on each bearing surface and is connected through the opening in the surface to a structure mounted beneath the support for reciprocation lengthwise only of the support. Each conveying element has a steep front face and tapers in height to the rear, so that, as the element is moved forwardly on its bearing surface, its front face engages and advances the material, while, on its return movement, the element slides under the material.

In the use of the apparatus of the prior patent, it has been found that, even though the top of each conveying element slopes downwardly to the rear at a low angle, the group of elements in their return movement convey some of the material to the rear. This return movement of the material cuts down the conveying capacity of the apparatus and increases the power required for conveying purposes.

The present invention is directed to the provision of a conveying apparatus of the type described, in which return movement of the material is prevented without any considerable resistance being offered to its forward movement. In the new apparatus, the return movement of the material is prevented by means of stationary checking members, which are mounted in alternation with the bearing members. The checking members may take various forms but, in all instances, they include substantially vertical surfaces extending transversely of the direction of movement of the material. In the new conveyor, the advance of the conveying elements causes the material to advance with them over and past the checking members, and, on the return movement of the elements, the material is held against backward movement by the checking members and the elements slide beneath the material.

For a better understanding of the invention, reference may be made to the accompanying drawings, in which—

Fig. 1 is a longitudinal vertical sectional view through a part of one form of apparatus;

Fig. 2 is a sectional view on the line 2—2 of Fig. 1;

Fig. 3 is a longitudinal sectional view on the line 3—3 of Fig. 2; and

Fig. 4 is a fragmentary longitudinal vertical sectional view of a preferred form of the apparatus.

The apparatus in the form illustrated in Figs. 1–3, inc., comprises a stationary support, which includes a plurality of bearing members 10 arranged in transverse rows. The end members of each row are supported on longitudinal central beams 11 and longitudinal flanges 12a on side beams 12 forming part of the housing for the apparatus, while intermediate bearing plates are mounted on beams 11 to span the spaces between them. Each bearing plate 10 is formed with a central opening 13 and a conveying element 14 rests upon the plate and covers the opening. The element has a steep front face 15 and its top surface 16 slopes downwardly at a low angle to the rear and may be formed, if desired, with a plurality of openings 17. Each element is provided with a pair of bolts 18, which extend downwardly on either side of one of a number of longitudinal beams 19. Each bolt passes through upper and lower transverse members 20, 21 engaging the top and bottom, respectively, of a beam 19 and, below member 21, the bolt is encircled by a spring 22 bearing at one end against member 21 and at the other against a washer 23 engaging the nut 24 on the end of the bolt. Each bolt also passes through a bushing 20a attached to the upper surface of transverse member 20.

The beams 19 are secured by brackets 25 to transverse beams 26, each end of which is secured to a longitudinal beam 27 having lengths of rail 28 secured to its under surface. The rails rest in channels in wheels 29 pivotally mounted on the walls 30 of the housing. Each beam 27 is provided with a pair of spaced lugs 31 extending downwardly from its bottom surface, and a roller 32 on an arm 33 carried by a rock shaft 34 lies between the lugs. As shaft 34 is rocked, the assembly lying beneath the support and comprising longitudinal beams 19, transverse beams 26, and longitudinal beams 27, is reciprocated on wheels 29. As the structure reciprocates horizontally, the conveying elements 14 are reciprocated on the bearing members 10, while being held tightly against the upper surfaces of their bearing members by springs 22.

The bearing members 10 are provided with transverse flanges 10a along their front and rear edges, and stationary checking members 35 are mounted in transverse rows between bearing members in adjacent transverse rows to rest upon the flanges thereof. The checking members are secured in place by bolts 36, which pass through openings in the flanges of beams 11 and the flanges 12a of beams 12. Each checking member is similar in form to a conveying element 14 and has a steep front face 37, a rear wall 38, and a transverse rib 39 connected to the front and rear walls by spaced ribs 40. The top of each checking member slopes downwardly at a low angle from the top of its front wall 37. The bolts 36 lie within reinforcements 41 attached to end walls connecting the front and rear wall of each checking member.

In the operation of the apparatus described, the material 42 to be conveyed is deposited on the support at one end thereof and, as the structure beneath the support is reciprocated, the front face 15 of each conveying element engages the material and advances it. In such movement, some of the material is forced over the checking members and deposited in front of the front faces 37 thereof. As the conveying elements move back, their upper surfaces tend to slide beneath the material and backward movement of the material with the elements is prevented by the front walls of the checking members behind the conveying elements. As the tops of the checking members slope down at a low angle to the rear, the members interpose little resistance to the forward movement of the material with the conveying elements.

In the construction shown in Fig. 4, each bearing member 43 is horizontal and is formed with a grate section 43a at opposite ends. A conveying element 44 rests on the central portion of each bearing member and is connected by bolts 45 to a longitudinal beam 46, similar to beam 19. The bearing members 43 are at successively lower levels in the direction of movement of the material and each bearing member is connected to those in front of and behind it by vertical walls 47 forming checking members. In the operation of this form of the apparatus, the material is advanced by the front walls of the conveying elements during the forward movement thereof and is prevented by walls 47 from being forced backwardly by the elements in their return movement.

The construction shown in Fig. 4 provides a simple arrangement of adjacent horizontal bearing members having vertical checking walls 47 located between them. Such a structure provides a minimum of parts and is readily erected and serviced, the grate sections 43a at opposite ends of each bearing member 43 conveying cooling gases to the conveyed material as it is checked by the vertical walls 47.

I claim:

1. Apparatus for conveying material in bulk, which comprises a substantially continuous generally horizontal stationary support including a plurality of bearing members spaced along the support and lying at successively lower levels in the direction of movement of the material and checking members forming a part of the support and alternating with the bearing members, each bearing member having a bearing surface at its top with a central opening therethrough and each checking member having an approximately vertical surface extending between and connecting the levels of the bearing members on either side of the checking member, a structure beneath the support mounted for reciprocation lengthwise only of the support, a conveying element resting on the bearing surface of each bearing member, the element having a steep front face and tapering in height to the rear, means extending through the openings in the bearing members for connecting the conveying elements to the structure to reciprocate therewith, and means for maintaining the elements in contact with their respective bearing surfaces during their reciprocation.

2. Apparatus for conveying material in bulk, which comprises a generally horizontal stationary support including a plurality of bearing members spaced along the support and lying at successively lower levels in the direction of movement of the material and checking members forming a part of the support and alternating with the bearing members, each bearing member having a bearing surface at its top with a central opening therethrough and each checking member having an approximately vertical surface extending between and connecting the levels of the bearing members on either side of the checking member, said bearing members being perforated adjacent at least one of said vertical surfaces, a structure beneath the support mounted for reciprocation lengthwise only of the support, a conveying element resting on the bearing surface of each bearing member, the element having a steep front face and tapering in height to the rear, means extending through the openings in the bearing members for connecting the conveying elements to the structure to reciprocate therewith, and means for maintaining the elements in contact with their respective bearing surfaces during their reciprocation.

3. Apparatus for conveying material in bulk, which comprises a generally horizontal stationary support including a plurality of bearing members spaced along the support and lying at successively lower levels in the direction of movement of the material and checking members forming a part of the support and alternating with the bearing members, each bearing member having a bearing surface at its top with a central opening therethrough and each checking member having an approximately vertical surface extending between and connecting the levels of the bearing members on either side of the checking member, said bearing members being perforated at their forward and rearward ends adjacent said vertical surfaces, a structure beneath the support mounted for reciprocation lengthwise only of the support, a conveying element resting on the bearing surface of each bearing member, the element having a steep front face and tapering in height to the rear, means extending through the openings in the bearing members for connecting the conveying elements to the structure to reciprocate therewith, and means for maintaining the elements in contact with their respective bearing surfaces during their reciprocation.

4. Apparatus for conveying material in bulk, which comprises a generally horizontal stationary support including a plurality of bearing members spaced along the support and lying at successively lower horizontal levels in the direction of movement of the material and horizontal checking members forming a part of the support and alternating with the bearing members, each bearing member having a bearing surface at its top with a central opening therethrough and each horizontal checking member having an approximately vertical surface extending between and connecting the levels of the bearing members on either side of the horizontal checking member, a structure beneath the support mounted for reciprocation lengthwise only of the support, a conveying element resting on the bearing surface of each bearing member, the element having a steep front face and tapering in height to the rear, means extending through the openings in the bearing members for connecting the conveying elements to the structure to reciprocate therewith, and means for maintaining the elements in contact with their respective bearing surfaces during their reciprocation.

5. Apparatus for conveying material in bulk, which comprises a generally horizontal stationary support including a plurality of bearing members spaced along the support and lying at successively lower horizontal levels in the direction of movement of the material and horizontal checking members forming a part of the support and alternating with the bearing members, each bearing member having a bearing surface at its top with a central opening therethrough and each horizontal checking member having an approximately vertical surface extending between and connecting the levels of the bearing members on either side of the horizontal checking member, said bearing members being perforated adjacent at least one of said vertical surfaces, a structure beneath the support mounted for reciprocation lengthwise only of the support, a conveying element resting on the bearing surface of each bearing member, the element having a steep front face and tapering in height to the rear, means extending through the openings in the bearing members for connecting the conveying elements to the structure to reciprocate therewith, and means for maintaining the elements in contact with their respective bearing surfaces during their reciprocation.

6. Apparatus for conveying material in bulk, which comprises a generally horizontal stationary support including a plurality of bearing members spaced along the support and lying at successively lower horizontal levels in the direction of movement of the material and horizontal checking members forming a part of the support and alternating with the bearing members, each bearing member having a bearing surface at its top with a central opening therethrough and each horizontal checking member having an approximately vertical surface extending between and connecting the levels of the bearing members on either side of the horizontal checking member, said bearing members being perforated at their forward and rearward ends adjacent said vertical surfaces, a structure beneath the support mounted for reciprocation lengthwise only of the support, a conveying element resting on the bearing surface of each bearing member, the element having a steep front face and tapering in height to the rear, means extending through the openings in the bearing members for connecting the conveying elements to the structure to reciprocate therewith, and means for maintaining the elements in contact with their respective bearing surfaces during their reciprocation.

References Cited in the file of this patent

UNITED STATES PATENTS

| | | |
|---|---|---|
| 2,431,799 | Gaffney | Dec. 2, 1947 |
| 2,498,218 | Nielsen | Feb. 21, 1950 |
| 2,592,010 | Cole et al. | Apr. 8, 1952 |